(12) United States Patent
Dwyer

(10) Patent No.: US 9,233,708 B2
(45) Date of Patent: Jan. 12, 2016

(54) VARIABLE EFFORT STEERING ASSEMBLY

(75) Inventor: Sean Dwyer, Gastonia, NC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/234,448

(22) PCT Filed: Jul. 27, 2011

(86) PCT No.: PCT/US2011/045449
§ 371 (c)(1),
(2), (4) Date: Jan. 23, 2014

(87) PCT Pub. No.: WO2013/015798
PCT Pub. Date: Jan. 31, 2013

(65) Prior Publication Data
US 2014/0159332 A1 Jun. 12, 2014

(51) Int. Cl.
*B62D 3/12* (2006.01)
*B62D 7/00* (2006.01)
*A01D 34/82* (2006.01)

(52) U.S. Cl.
CPC ............... *B62D 3/126* (2013.01); *A01D 34/82* (2013.01); *B62D 3/12* (2013.01); *B62D 7/00* (2013.01)

(58) Field of Classification Search
CPC .......... B62D 3/12; B62D 3/126; B62D 7/142; B62D 3/00; B62D 5/008; B62D 5/22; B62D 7/15; B62D 7/1527; B62D 7/00; A01D 78/1042; A01D 34/82; B60W 30/02; B60W 30/045; B66F 9/07568; F16H 19/00; F16H 35/02
USPC .................................................... 280/93.514
See application file for complete search history.

(56) References Cited

U.S. PATENT DOCUMENTS

| 60,301 | A | | 12/1866 | Wells |
| 698,771 | A | | 4/1902 | Windlass |
| 2,384,742 | A | * | 9/1945 | Hewitt ............................ 74/110 |
| 2,973,658 | A | * | 3/1961 | Bishop ............................ 91/382 |

(Continued)

FOREIGN PATENT DOCUMENTS

CN 87100759 A 10/1987

OTHER PUBLICATIONS

International Search Report and Written Opinion of PCTUS2011/045449 mailed Dec. 9, 2011, all enclosed pages cited.

*Primary Examiner* — Paul N Dickson
*Assistant Examiner* — Timothy Wilhelm
(74) *Attorney, Agent, or Firm* — Nelson Mullins Riley & Scarborough LLP

(57) ABSTRACT

A vehicle such as a riding lawn care vehicle may include a frame and a steering assembly. Wheels of the vehicle may be attachable to the frame. The steering assembly may include a steering apparatus operably coupled to at least one of the wheels of the vehicle to provide steering inputs to the at least one of the wheels based on a position of the steering apparatus. The steering assembly may further include a steering column, a pinion assembly and a rack assembly. The steering column may extend from the steering apparatus to rotate responsive to movement of the steering apparatus. The pinion assembly may be disposed along the steering column and include at least two pinions of different sizes. The rack assembly may be operably coupled to the frame and the at least one wheel of the vehicle to translate steering inputs from the steering apparatus to the at least one wheel via the pinion assembly. The rack assembly may include at least two rack portions of different sizes.

26 Claims, 6 Drawing Sheets

(56) References Cited

U.S. PATENT DOCUMENTS

| | | |
|---|---|---|
| 3,572,459 A * | 3/1971 | Nieminski .................... 180/425 |
| 5,018,469 A * | 5/1991 | Carlson .................... 114/144 R |
| 5,099,714 A | 3/1992 | Hutchison et al. |
| 5,482,130 A | 1/1996 | Shimizu |
| 5,492,348 A | 2/1996 | Shaw et al. |
| 6,695,092 B2 | 2/2004 | Cole |
| 6,921,109 B2 | 7/2005 | Hutchison et al. |
| 7,914,022 B2 | 3/2011 | Ruebusch et al. |
| 8,157,030 B2 * | 4/2012 | Greenwood et al. ......... 180/6.48 |
| 8,196,487 B2 * | 6/2012 | Bless et al. ...................... 74/437 |
| 8,474,841 B2 * | 7/2013 | Ruebusch et al. ........ 280/93.502 |
| 2009/0032324 A1 * | 2/2009 | Suzuki et al. ................. 180/240 |
| 2009/0178862 A1 | 7/2009 | Greenwood et al. |

* cited by examiner

VARIABLE EFFORT STEERING ASSEMBLY

TECHNICAL FIELD

Example embodiments generally relate to steering systems and, more particularly, relate to a variable effort steering system for a vehicle, such as a vehicle configured for performing lawn maintenance.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers and/or the like) in addition to grass cutting components. Riding lawn mowers provide the convenience of a riding vehicle as well as a typically larger cutting deck as compared to a walk-behind model.

By their very nature, riding lawn mowers include steering assemblies that are used to direct the movement of the riding lawn mowers. The steering assemblies often take the familiar form of a steering wheel operably coupled to one or more wheels. With many conventional lawn mower steering assemblies, the steering effort required by the operator in order to turn the steering wheel increases as the steering assembly reaches its maximum turn configuration. Furthermore, an operator often desires finer steering control in some situations, but quicker steering responsiveness in other situations. As such, conventional mechanical steering systems are designed to balance these competing performance characteristics so as to obtain acceptable, but often less than optimal, steering performance over a range of situations. Therefore, improved steering assemblies are needed.

BRIEF SUMMARY OF SOME EXAMPLES

Accordingly, in order to improve steering response for a vehicle, such as a riding lawn care vehicle, some example embodiments may provide a stacked rack and stacked pinion arrangement for use on the vehicle. In this regard, at least two pinions may be positioned along the steering shaft and at least two rack assemblies may be correspondingly arranged such that one pinion and rack pair are engaged over a first range of motion of the steering assembly and a second pinion and rack pair are engaged over other portions of the range of motion of the steering assembly. Such a stacked arrangement may provide for the employment of different steering ratios over corresponding different portions of the full range of motion of the steering assembly. Accordingly, steering effort may be reduced over some portions of the range of motion of the steering assembly and responsiveness may be increased over other portions of the range of motion of the steering assembly. In other words, some example embodiments may provide a variable effort steering system that may enable easier handling for operators when executing turns.

In one example embodiment, a riding lawn care vehicle is provided. The riding lawn care vehicle may include a frame and a steering assembly. Wheels of the riding lawn care vehicle may be attachable to the frame. The steering assembly may include a steering apparatus operably coupled to at least one of the wheels of the riding lawn care vehicle to provide steering inputs to the at least one of the wheels based on a position of the steering apparatus. The steering assembly may further include a steering column, a pinion assembly and a rack assembly. The steering column may extend from the steering apparatus to rotate responsive to movement of the steering apparatus. The pinion assembly may be disposed along the steering column and include at least two pinions of different sizes. The rack assembly may be operably coupled to the frame and the at least one wheel of the riding lawn care vehicle to translate steering inputs from the steering apparatus to the at least one wheel via the pinion assembly. The rack assembly may include at least two rack portions of different sizes.

In another example embodiment, a steering assembly for steering control of a riding lawn care vehicle is provided. The steering assembly may include a steering apparatus, a steering column, a pinion assembly and a rack assembly. The steering apparatus may be operably coupled to at least one of wheel of the riding lawn care vehicle to provide steering inputs to the at least one of wheel based on a position of the steering apparatus. The steering column may extend from the steering apparatus to rotate responsive to movement of the steering apparatus. The pinion assembly may be disposed along the steering column and including at least two pinions of different sizes. The rack assembly may be operably coupled to a frame to which wheels of the riding lawn care vehicle are attachable. The rack assembly may be further operably coupled to the at least one wheel of the riding lawn care vehicle to translate steering inputs from the steering apparatus to the at least one wheel via the pinion assembly. The rack assembly may include at least two rack portions of different sizes.

In another example embodiment, a method of providing steering for a riding lawn care vehicle is provided. The method may include providing a steering assembly including a steering apparatus operably coupled to at least one wheel of the riding lawn care vehicle to provide steering inputs to the at least one wheel based on a position of the steering apparatus, providing a steering column extending from the steering apparatus to rotate responsive to movement of the steering apparatus, and providing a pinion assembly disposed along the steering column and including at least two pinions of different sizes. The method may further include enabling steering inputs to be translated from the pinion assembly to the at least one wheel via a rack assembly operably coupled to a frame to which wheels of the riding lawn care vehicle are attachable. The rack assembly may be further operably coupled to the at least one wheel of the riding lawn care vehicle to translate steering inputs from the steering apparatus to the at least one wheel via the pinion assembly. The rack assembly may include at least two rack portions of different sizes.

In still another example embodiment, a steering assembly is provided having a steering apparatus (e.g., a steering wheel or the like) operably coupled to at least one steering implement (e.g., a wheel, axle, rudder, or the like) of a vehicle to provide steering inputs to the at least one steering implement throughout a steering range. The steering inputs are based on a position of the steering apparatus. The steering assembly includes a first gear, a second gear, a third gear, and a fourth gear. The first gear and second gears are operably coupled to the steering apparatus and configured to rotate responsive to movement of the steering apparatus. The first gear and second gear are different sizes. The third gear and the fourth gear are operably coupled to the at least one steering implement. The steering assembly is configured so that: (1) the first gear engages the third gear during a first portion of the steering range to translate steering inputs from the steering apparatus to the at least one steering implement via the first gear and the third gear; (2) the second gear does not engage the third gear during the first portion of the steering range; (3) the second gear engages the fourth gear during a second portion of the steering range to translate steering inputs from the steering apparatus to the at least one steering implement via the second gear and the fourth gear; and (4) the first gear does not engage the fourth gear during the second portion of the steering range.

In some such embodiments, the first gear may be fixed relative to the second gear, the first and second gears may rotate about a common axis, and the third gear may be fixed relative to the fourth gear. The first and second gears may be circular gears having different diameters. In some embodiments, the steering assembly further includes a steering column that rotates responsive to rotation of the steering apparatus, and the first and second gears may be attached to the steering column to rotate responsive to rotation of the steering column. In some embodiments, the third and fourth gears comprise at least a portion of two circular gears that rotate about a common axis but gave different radiuses. In other embodiments, the first gear comprises a first pinion gear having a first radius, the second gear comprises a second pinion gear having a second radius, the third gear comprises a first linear rack gear, the fourth gear comprises a second linear rack gear, and teeth of the third gear are disposed a distance apart from the teeth of the fourth gear equal to the difference between the first radius and the second radius.

Some example embodiments may improve an operator's ability to steer a riding lawn care vehicle and/or reduce the effort necessary to steer the riding lawn care vehicle. The user experience associated with achieving less strenuous and more effective maneuvering on a riding lawn care vehicle may therefore be improved.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 4:
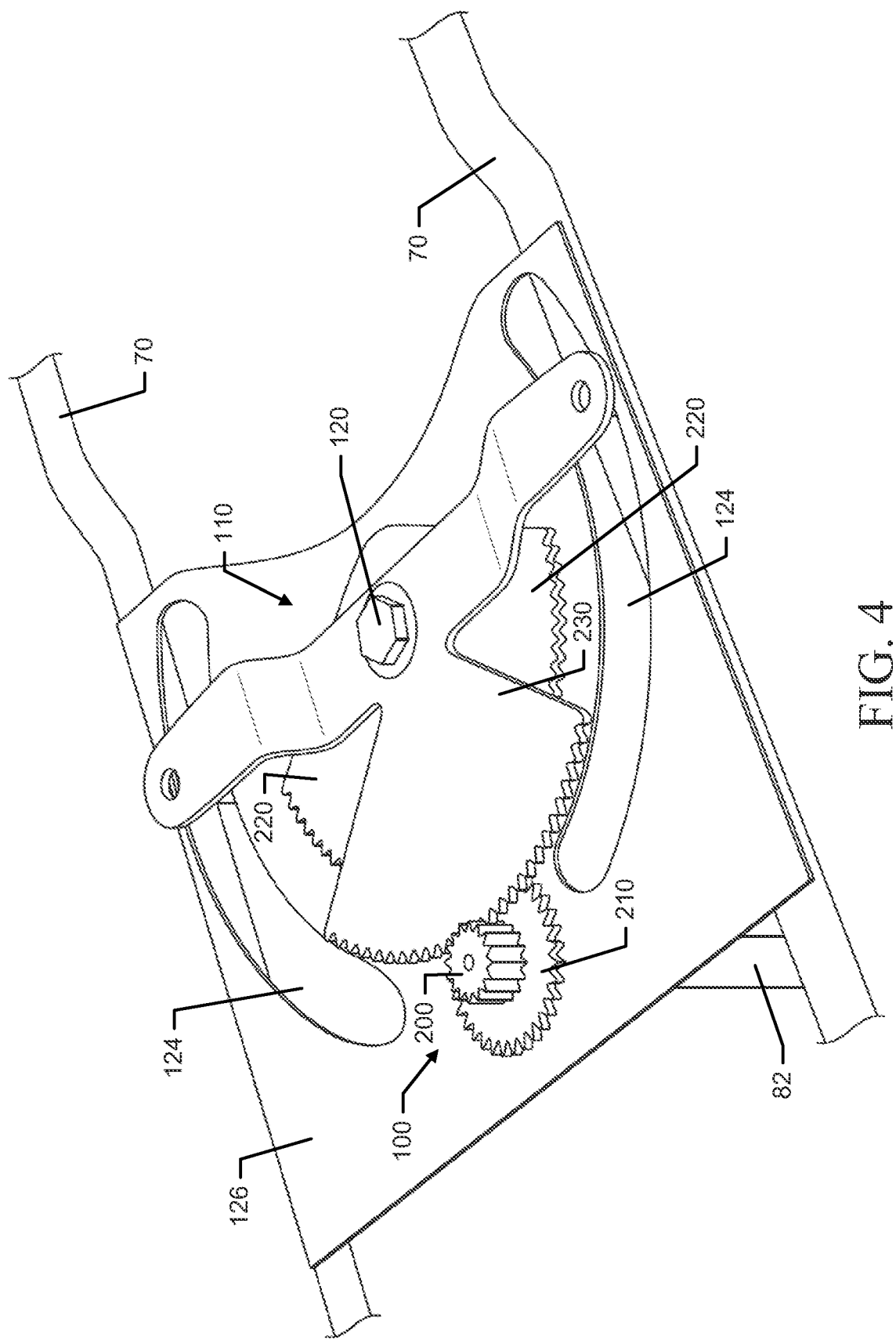
FIG. 4 illustrates a closer perspective view of the stacked arrangement of the dual pinion and dual rack steering assembly shown in FIG. 3 according to an example embodiment.
Figure 5:
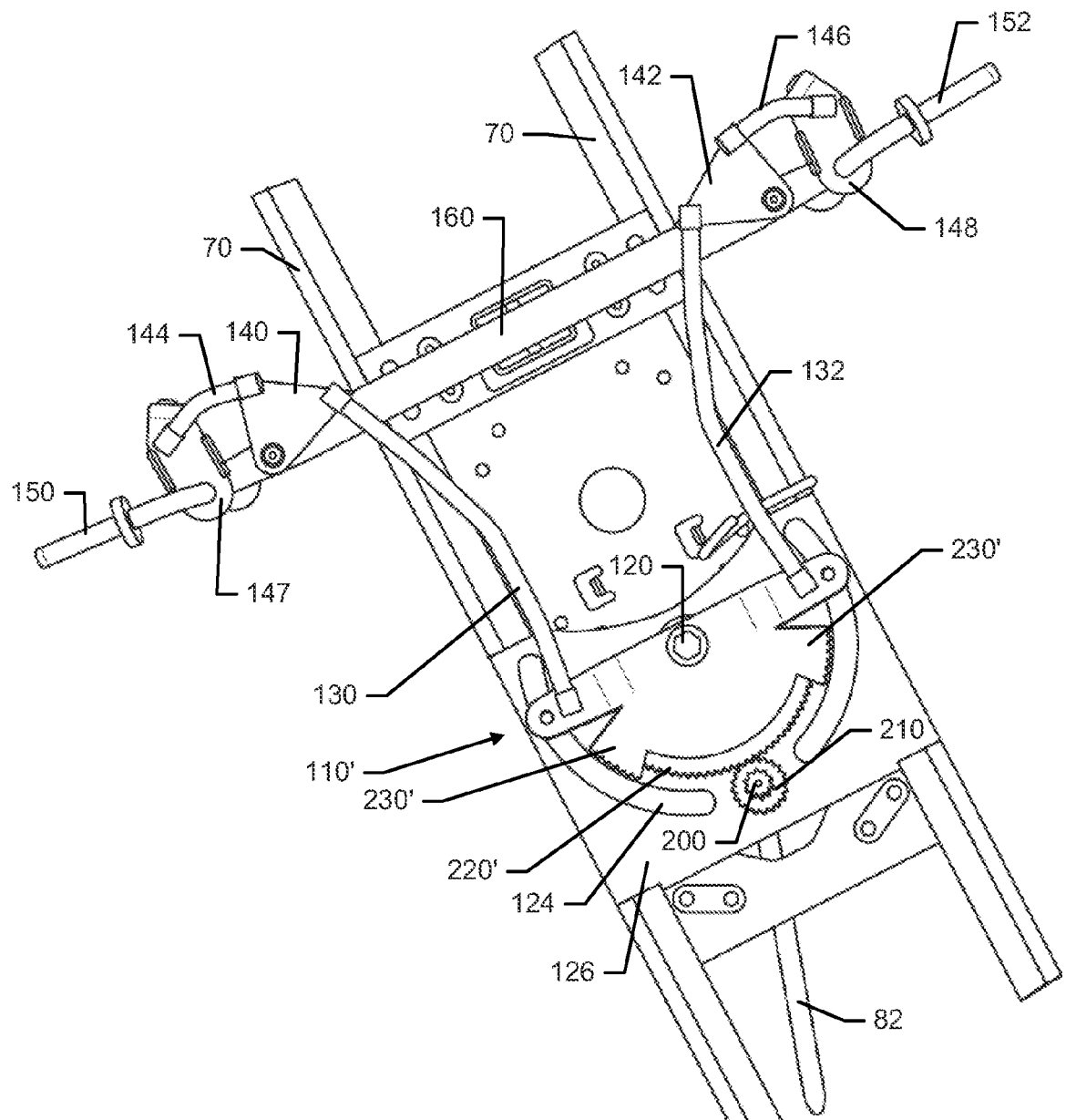
Figure 6:
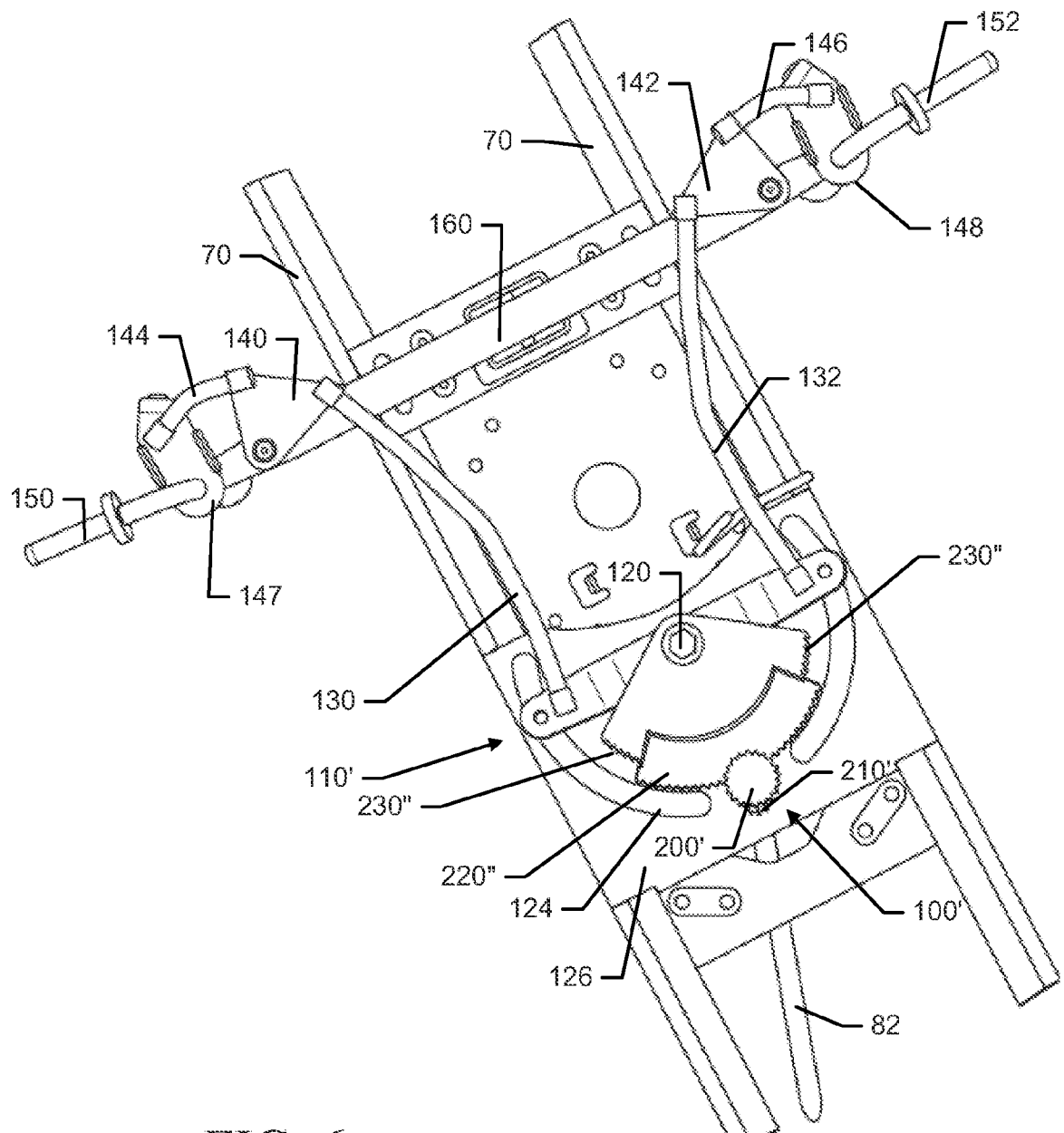

FIG. 5 illustrates an alternative stacked arrangement of the dual pinion and dual rack steering assembly in which the contact areas of the rack assembly are switched relative to positions of the contact areas displayed in the example shown in FIG. 4; and FIG. 6 illustrates an alternative stacked arrangement of the dual pinion and dual rack steering assembly in which an order of the pinions of the pinion assembly and a corresponding ordering of the partial rack portions of the rack assembly are switched relative to the example shown in FIG. 4.

DETAILED DESCRIPTION

Some example embodiments now will be described more full hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other.

Some example embodiments may improve the turning capability of a vehicle, such as a lawn care vehicle, by employing multiple pinion gears and corresponding multiple racks with different steering ratios. Accordingly, different steering characteristics relating to turning effort and responsiveness may be offered over different portions of the entire range of motion of the steering wheel and the steering assembly.

Figure 1:
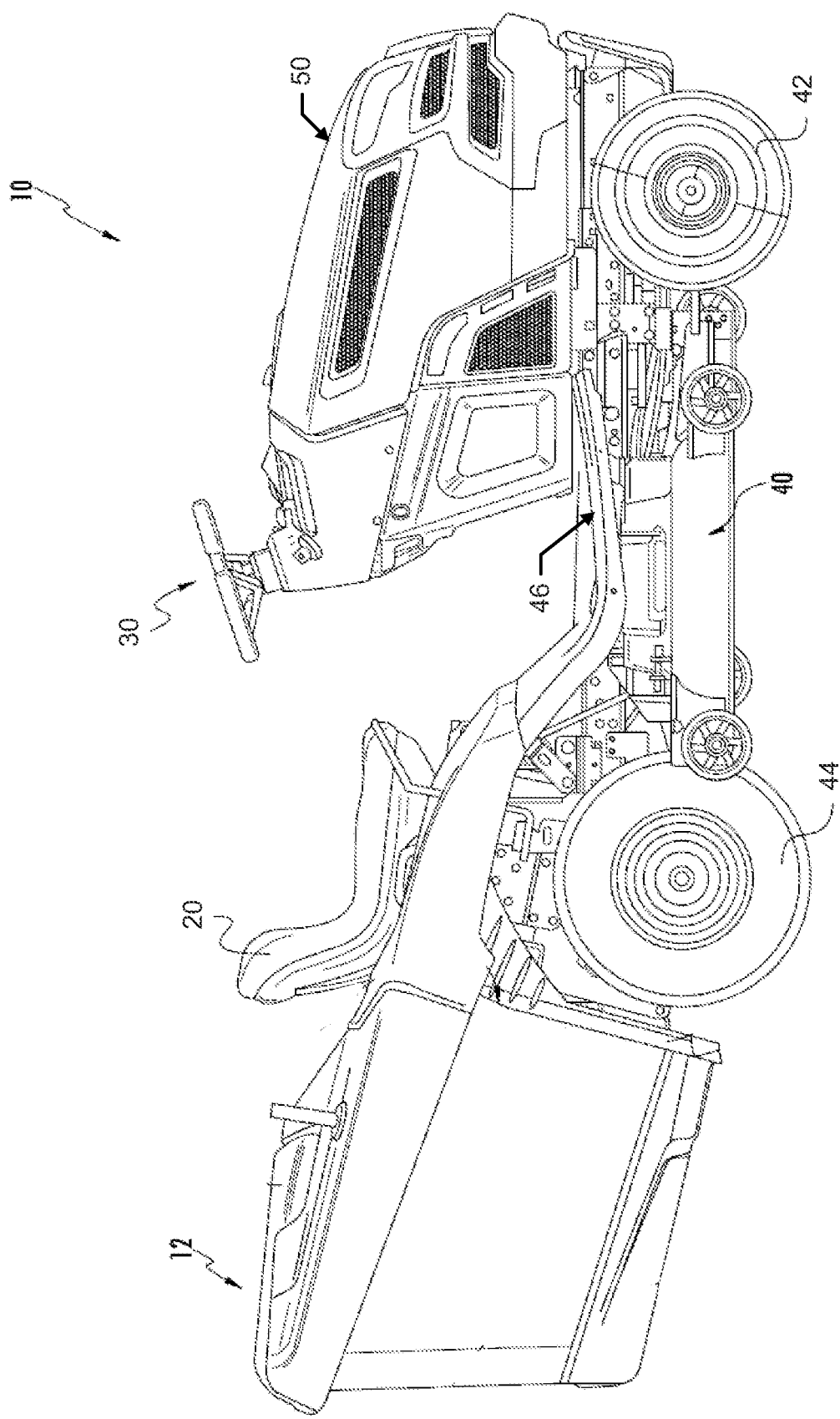
FIG. 1 illustrates a side view of a riding lawn care vehicle according to an example embodiment.

FIG. 1 illustrates a side view of a riding lawn care vehicle 10 having a bagging attachment 12. However, it should be appreciated that example embodiments may be employed on numerous other riding lawn care vehicles that may not include a bagging attachment 12. As shown and described herein, the riding lawn care vehicle 10 may be a riding lawn mower (e.g., a lawn tractor, front-mount riding lawn mower, zero-turn riding lawn mower, and/or the like). However, other example embodiments may be employed on riding lawn care vehicles that are configured or otherwise equipped to handle snow removal, brush cutting, tilling or other lawn care-related activities.

In some embodiments, the riding lawn care vehicle 10 may include a seat 20 that may be disposed at a center, rear or front portion of the riding lawn care vehicle 10. The riding care vehicle 10 may also include a steering assembly 30 (e.g., including a steering wheel, handle bars, or other steering apparatus) functionally connected to wheels of the riding lawn care vehicle 10 to which steering inputs are provided (e.g., the front and/or rear wheels in various different embodiments) to allow the operator to steer the riding lawn care vehicle 10. The operator may sit on the seat 20, which may be disposed to the rear of the steering assembly 30 to provide input for steering of the riding lawn care vehicle 10 via the steering assembly 30.

The riding lawn care vehicle 10 may also include, or be configured to support attachment of, a cutting deck 40 having at least one cutting blade mounted therein. As indicated above, in some cases, a height of the at least one cutting blade may be adjustable by an operator of the riding lawn care vehicle 10. The cutting deck 40 may be a fixed or removable attachment in various different embodiments. Moreover, a location of the cutting deck 10 may vary in various alternative embodiments. For example, in some cases the cutting deck 40 may be positioned in front of the front wheels 42, behind the rear Wheels 44, or in between the front and rear wheels 42 and 44 (as shown in FIG. 1) to enable the operator to cut grass using the at least one cutting blade when the at least one cutting blade is rotated below the cutting deck 40. When operating to cut grass, the grass clippings may be captured by a collection system (e.g., bagging attachment 12), mulched, or expelled from the cutting deck 40 via either a side discharge or a rear discharge.

The riding lawn care vehicle 10 may also include additional control related components such as one or more speed controllers, cutting height adjusters and/or the like. Some of the controllers, such as the speed controllers, may be provided in the form of foot pedals that may sit proximate to a footrest 46 (which may include a portion on both sides of the riding lawn care vehicle 10) to enable the operator to rest his or her feet thereon while seated in the seat 20.

In the pictured example embodiment of FIG. 1, an engine 50 of the riding lawn care vehicle 10 is disposed substantially forward of a seated operator. However, in other example embodiments, the engine 50 could be in different positions such as below or behind the operator. In some embodiments, the engine 50 may be operably coupled to one or more of the wheels of the riding lawn care vehicle 10 in order to provide drive power for the riding lawn care vehicle 10. In some embodiments, the engine 50 may be capable of powering two wheels, while in others, the engine 50 may power all four wheels of the riding lawn care vehicle 10. Moreover, in some cases, the engine 50 may manually or automatically shift between powering either two wheels or all four wheels of the riding lawn care vehicle 10.

Figure 2:
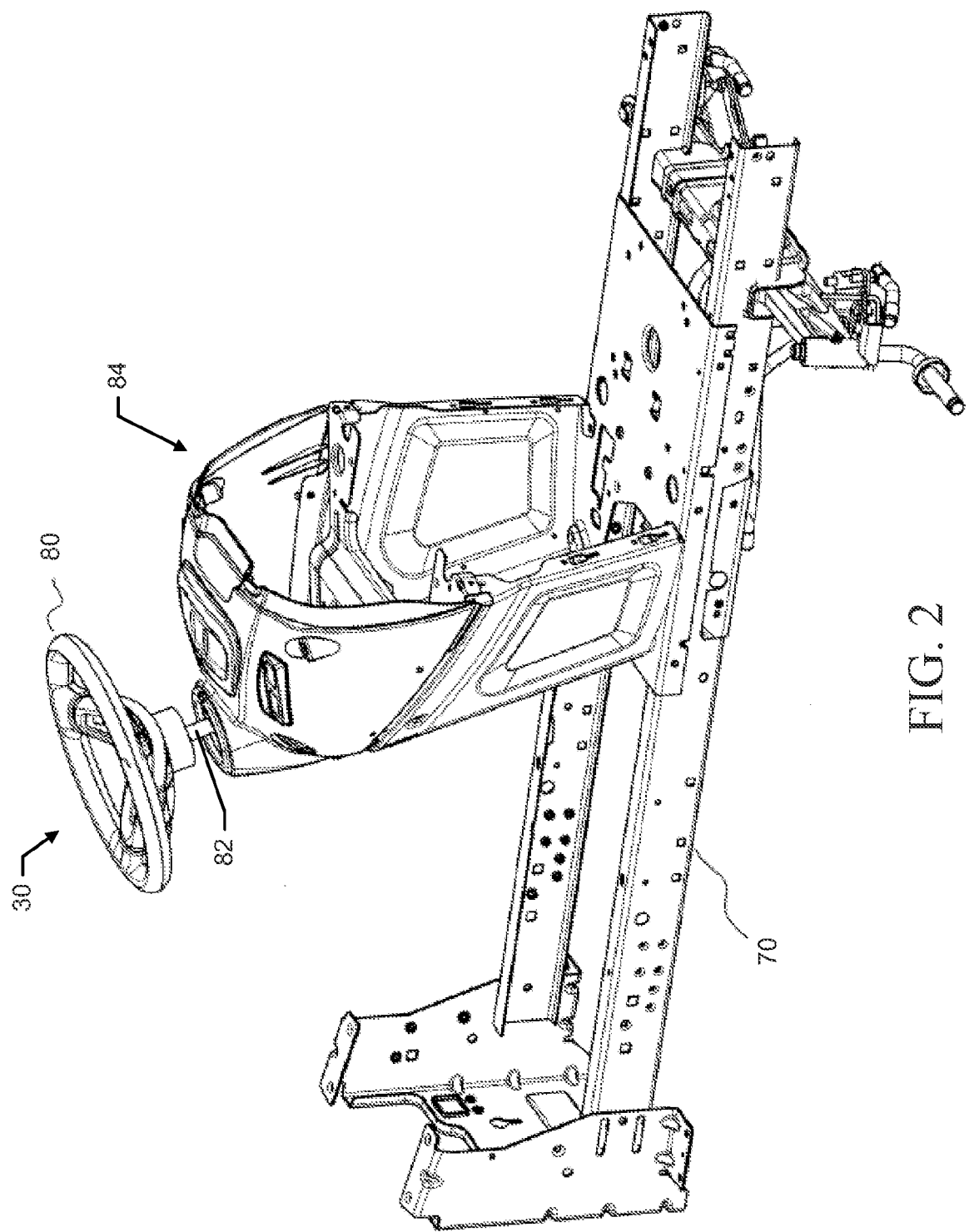
FIG. 2 illustrates a perspective view of a frame of the riding lawn care vehicle including some portions of the steering assembly according to an example embodiment.
Figure 3:
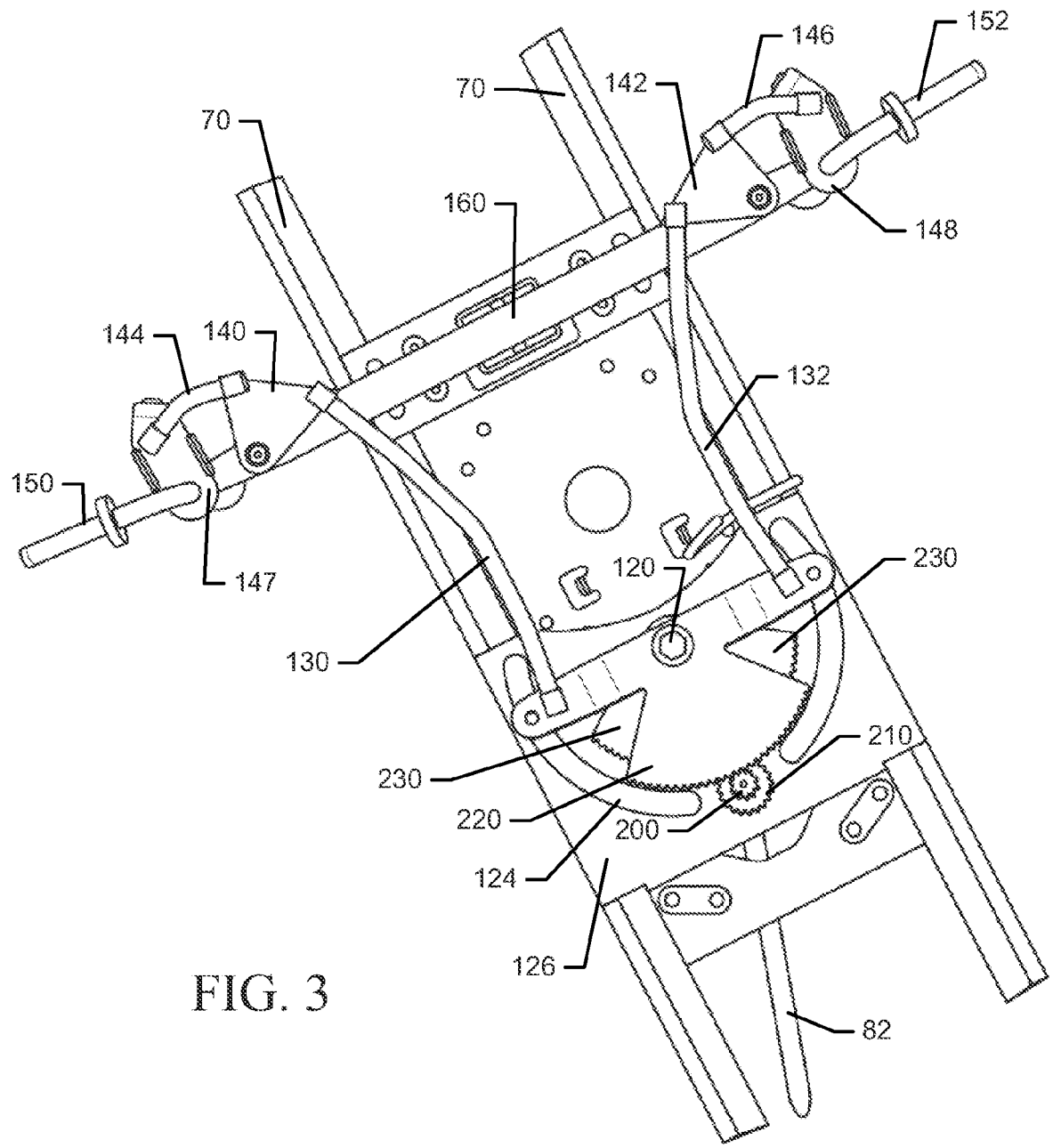
FIG. 3 illustrates a perspective view of an underside of the frame shown in FIG. 2 to illustrate a stacked arrangement of a dual pinion and dual rack steering assembly of the riding lawn care vehicle according to an example embodiment.

Portions of the steering assembly 30 of the riding lawn care vehicle 10 will now be described in greater detail in reference to FIGS. 2-6. In this regard, FIG. 2 illustrates a perspective view of a frame of the riding lawn care vehicle including some portions of the steering assembly according to an example embodiment. FIG. 3 illustrates a perspective view of an underside of the frame shown in FIG. 2 to illustrate a stacked arrangement of a dual pinion and dual rack steering assembly of the riding lawn care vehicle according to an example embodiment. FIG. 4 illustrates a closer perspective view of the stacked arrangement of the dual pinion and dual rack steering assembly shown in FIG. 3 according to an example embodiment. FIG. 5 illustrates an alternative stacked arrangement of the dual pinion and dual rack steering assembly in which the contact areas of the rack assembly are switched relative to positions of the contact areas displayed in the example shown in FIG. 4. FIG. 6 illustrates an alternative stacked arrangement of the dual pinion and dual rack steering assembly in which an order of the pinions of the pinion assembly and a corresponding ordering of the partial rack portions of the rack assembly are switched relative to the example shown in FIG. 4

As shown in FIG. 2, the engine 50, the steering assembly 30, the cutting deck 40, the seat 20 and other components of the riding lawn care vehicle 10 may be operably connected (directly or indirectly) to a frame 70 of the riding lawn care vehicle 10. The frame 70 may be a rigid structure configured to provide support, connectivity and interoperability functions for various ones of the components of the riding lawn care vehicle 10.

In an example embodiment, the steering assembly 30 may include a steering wheel 80 and a steering column 82 (or shaft). The steering column 82 may operably connect to the steering wheel 80 and additional steering assembly components shown in FIG. 2 that translate inputs in the form of motion of the steering wheel 80 into steering controls to the wheels to which steering inputs are provided (e.g., the front wheels in this example). Moreover, in some embodiments, the steering column 82 may extend into a steering console 84, which may provide a cover to improve the aesthetic appearance of the riding lawn care vehicle 10 by obscuring the view of various mechanical components associated with the steering assembly 30.

In some example embodiments, the steering assembly 30 may be embodied as an assembly of metallic or other rigid components that may be welded, fitted, bolted or otherwise operably coupled to each other and coupled to the wheels 32 of the riding lawn care vehicle 10 to which steering inputs are provided. For example, the steering assembly 30 may include or otherwise be coupled with a steering cable assembly to translate rotational motion applied to the steering assembly 30 (and more particularly to the steering wheel 80) into directional inputs to orient the wheels to which steering inputs are provided (e.g., front wheels in this example) accordingly.

As shown in FIGS. 3 and 4, the steering column 82 may terminate at or proximate to a pinion assembly 100 that may engage a rack assembly 110. In an example embodiment, the pinion assembly 100 may include at least two pinion gears and the rack assembly 110 may include at least two corresponding rack gears. Moreover, in some embodiments, the at least two pinion gears may be provided in a stacked arrangement such that they are proximate to each other at a distal end of the steering column 82. Meanwhile, the at least two rack gears may also be provided in a stacked arrangement such that they are proximate to each other. The at least two rack gears may also be provided such that they engage respective ones of the at least two pinion gears via gear teeth disposed at the periphery of each of the at least two pinion gears and the at least two rack gears. As such, one of the at least two rack gears may be paired with a corresponding one of the at least two pinion gears to form a first gear pair, while the remaining ones of the at least two pinion gears and the at least two rack gears form a second gear pair. The gear ratios (or steering ratios) of the corresponding gear pairs may each be different. Furthermore, each of the at least two rack gears may be constructed such that they only engage their respective pinions over different portions of the full range of motion of the rack assembly 110. As such, turning of the steering wheel 80 will cause corresponding rotation of the steering column 82 and each of the at least two pinion gears. However, only one of the at least two pinion gears will engage its corresponding one of the at least two rack gears at any given time. Moreover, over the fall range of motion of the rack assembly 110, the one of the at least two rack gears that is engaged with its corresponding one of the at least two pinion gears will change dependent upon the position of the steering wheel 80.

It will be appreciated that, although FIGS. 3-6 illustrate the pinion gears as spur-type gears and the rack gears as curvilinear rack-type gears (e.g., portions of larger circular spur gears), other types of gears may be used in similar ways in other embodiments of the invention. For example, the rack gears may be linear rack gears instead of curvilinear rack gears. Furthermore, the rack and pinion gears may not be spur-type gears and may instead be helical or bevel style gears. The terms "pinion" and "rack" are intended to encompass all such possibilities of gears unless specifically limited otherwise.

As shown in FIGS. 3 and 4, as the rack assembly 110 rotates responsive to motion of the steering wheel 80 (via the corresponding motion of the steering column 82 and the pinion assembly 100), the rack assembly 110 pivots around a fixed point 120. In an example embodiment, the rack assembly 110 may include detents or guide posts that extend through guide slots 124 provided in a plate 126 that extends between members of the frame 70 to guide (and in some cases limit) rotation of the rack assembly 110. In some cases, steering ties (e.g., a first steering tie 130 and a second steering tie 132) may be operably coupled to the rack assembly 110 at opposite ends of the rack assembly 110. The steering ties may be coupled to the rack assembly 110 at a point proximate to the location of the detents or guide posts that extend through the guide slots 124.

The steering ties may extend from the rack assembly 110 toward portions of the steering assembly 30 that engage the wheels to which steering inputs are provided. For example, the first steering tie 130 and second steering tie 132 may extend to engage a first steering knuckle 140 and a second steering knuckle 142, respectively, via a first tie rod 144 and a second tie rod 146, respectively coupled to first and second rotator plates 147 and 148. The first and second steering knuckles 140 and 142 may each be affixed to corresponding ones of a first axle rod 150 and a second axle rod 152. The first and second axle rods 150 and 152 may be rotatably mounted to opposite ends of an axle mount 160 that may form a portion of the frame 70, or may be connected to the frame 70. The axle mount 160 may extend substantially perpendicularly to the longitudinal length of the riding lawn care vehicle 10 substantially between the wheels to which steering inputs are provided. The wheels may be affixed to the first and second axle rods 150 and 152, respectively.

In some examples, the axle mount 160 may be structured as a single assembly, weldment, rod, tube or other support structure having a first distal end that rotatably engages the first axle rod 150 and a second distal end that rotatably engages the second axle rod 152. In some embodiments, the first and second distal ends of the axle mount 160 may terminate in respective first and second sleeves that may receive the first and second axle rods 150 and 152, respectively, therein. In some embodiments, the first and second sleeves may further include bearings (e.g., a bushing, ball bearing or journal bearing) to facilitate rotational relative motion between the first and second sleeves and the first and second axle rods 150 and 152, respectively.

In an example embodiment, first and second steering knuckles 140 and 142 may be relatively mirror image reproductions of each other oriented to operate on opposite sides of the riding lawn care vehicle 10. Similarly, the first and second axle rods 150 and 152 may be relatively mirror image reproductions of each other oriented to operate on opposite sides of the riding lawn care vehicle 10.

Rotation of the rack assembly 110 may correspondingly cause a push to be provided to one of the steering ties and a pull to be provided to the other of the steering ties. These push and pull forces will then cause rotation of the first and second rotator plates 147 and 148 to push and pull respective ones of the first and second tie rods 144 and 146 to rotate the first and second steering knuckles 140 and 142 to cause turning of the first and second axle rods 150 and 152 in the same direction (e.g., both right or both left depending on the direction the steering wheel 80 was turned) within the first and second sleeves. The wheels turn accordingly and steering of the riding lawn care vehicle 10 is accomplished.

It will be appreciated that some embodiments of the invention may utilize different configurations than what's illustrated in FIGS. 3 and 4 for coupling the rack assembly 110 to the wheels. For example, where linear rack gears are used instead of the curvilinear rack gears 220 and 230, the rack assembly 110 may be disposed substantially between the wheel axles 150 and 152 so that rotation of the pinion moves the linear rack gears laterally toward one wheel axle and away from the other. In such an example, each rack may be directly or indirectly coupled to the steering knuckles 140 and 112 so that movement of the linear rack gears in a first direction pushes on one knuckle and pulls on the other, and movement of the linear rack gear in a second direction has the opposite effect on each knuckle.

As described above, and shown in more detail in the example embodiment of FIG. 4, in some embodiments only one of the at least two pinion gears of the pinion assembly 100 may engage its corresponding one of the at least two rack gears of the rack assembly 110 at any given time. To accomplish this functionality, the pinion assembly 100 may be structured in a stacked arrangement. In this regard, the pinion assembly 100 may include a first pinion 200 and a second pinion 210 that may be disposed proximate to each other at a distal end of the steering column 82 relative to the steering wheel 80. In this example, the first pinion 200 may have a smaller diameter than the second pinion 210, and the first pinion 200 may be disposed at the distal end of the steering column 82, while the second pinion 210 is disposed inwardly with respect to the first pinion 200 on the steering column 82. In this example, the first and second pinions 200 and 210 are adjacent to one another. However, in alternative embodiments, a space could be provided between the first and second pinions 200 and 210.

Each of the first and second pinions 200 and 210 may be substantially cylindrical or circular shaped and may include gear teeth disposed around an external periphery thereof to engage gear teeth of a corresponding one of the at least two racks of the rack assembly 110 when the rack assembly 110 is positioned such that one of the at least two racks of the rack assembly 110 engages a corresponding one of the at least two pinions of the pinion assembly 100. In an example embodiment, the rack assembly 110 may include a first partial rack 220 and a second partial rack 230. The portions of the rack assembly 110 may be referred to as "partial" racks because such portions are structured and/or arranged such that they only interact with or engage their respective pinions over a discrete portion of the full range of motion of the rack assembly 110. To accomplish this, each of the partial racks may be constructed to only include contact areas (e.g., portions having gear teeth capable of engaging the gear teeth of their respective pinion) over a fraction of the full range of motion of the rack assembly 110.

In the example of FIG. 4, the rack assembly 110 is constructed such that the first partial rack portion 220 engages the first pinion 200 over a first portion of the full range of motion of the rack assembly 110 and the second partial rack portion 230 engages the second pinion 210 over a second portion of the of the full range of motion of the rack assembly 110. More particularly, the first partial rack portion 220 engages the first pinion 200 over a fraction (e.g., two-thirds or some other value) of the range of motion from one edge of the total contact area of the rack assembly 110 to the opposing edge of the total contact area of the rack assembly 110 and the second partial rack portion 230 engages the second pinion 210 over the remainder of the total contact area (e.g., the remaining one-third). In this example, the second portion, which defines the contact area of the second partial rack portion 230, may be split such that substantially equal portions of the contact area of the second partial rack portion 230 are disposed to extend from a radial position proximate to each opposite end of the first partial rack portion 220. As such, in some embodiments, a second contact area defined by the second partial rack portion 230 may include two portions, and respective ones of the two portions may extend from a position proximate to the opposite ends of the contact area (e.g., the first contact area) of the first partial rack portion 220 to define a discontinuous second contact area with the first contact area interposed therebetween. This arrangement allows for the same steering characteristic to be offered at each of the extreme ends of the total steering range of motion by the combination of the second partial rack portion 230 and the second pinion 210 and the steering ratio defined by the gear ratio associated therewith. Meanwhile, steering conducted closer to a neutral position (e.g., where the steering wheel is at and/or around the twelve o'clock position) may have different steering characteristics provided by the combination of the first partial rack portion 220 and the first pinion 200.

The rack assembly 110 may be constructed of two partial disc shaped members corresponding to respective ones of the first and second partial rack portions 220 and 230. The two partial disc shaped members may be welded together, bolted together, held together by a combination of one or more detents and corresponding receivers, or even formed from a unitary piece of material. In some embodiments, each of the partial disc shaped members may have a different diameter extending from a common pivot point. The different diameters may be determined based on a diameter from the common pivot point that is sufficient to enable the contact area of the corresponding one of the first and second partial rack portions 220 and 230 to engage the gear teeth of their respective pinion (e.g., the first and second pinions 200 and 210, respectively). In the example of FIG. 4, since the second pinion 210 has a larger diameter than the first pinion 200, the first partial rack portion 220 has a larger diameter than the second partial rack portion 230 by an amount that equivalent to the difference in the diameters of the first and second pinions 200 and 210.

Where linear rack gears are used instead of curvilinear rack gears 220 and 230, two or more linear rack gear portions are fixed together so that the teeth of at least one portion are disposed a distance from the teeth of at least one other portion, the distance being equal to the different between the radius of the first pinion 200 and the radius of the second pinion 210.

Other arrangements may also be provided, as shown in the examples of FIGS. 5 and 6. In this regard, FIG. 5 illustrates an example having the same first and second pinions 200 and 210, but switching the contact areas of the gears of the rack assembly 110'. In other words, the contact areas of the first and second partial rack portions 220' and 230' are switched. Thus, the partial rack portion having the larger diameter (e.g., first partial rack portion 220') is constructed such that its contact area is split to extend from opposite ends of the contact area of the partial rack portion having the smaller diameter (e.g., second partial rack portion 230').

FIG. 6 shows yet another alternative in which an alternative pinion assembly 100' is shown in combination with an alternative rack assembly 110". In the alternative pinion assembly 100', the pinion having a larger diameter (e.g., first pinion 200') is disposed at the distal end of the steering column 82 and the pinion having the smaller diameter (e.g., second pinion 210') is disposed inwardly of the pinion having the larger diameter along the steering column 82. The alternative rack assembly 110" may include a rack portion having a smaller diameter (e.g., first partial rack portion 220"), which may be disposed to correspond to the position of the first pinion 200', while the rack portion having the larger diameter (e.g., second partial rack portion 230") is disposed to correspond to the position of the second pinion 210'. Other example arrangements are also possible, including the use of more than two pinions and corresponding rack portions. Although some example embodiments may arrange the use of more than two pinions and corresponding rack portions such that the contact areas are arranged to be engaged in increasing or decreasing order of the diameters of the components such that responsiveness increases or decreases accordingly as each respective gear pair is encountered during a turn from the neutral position to a maximum turn (e.g., max right or max left), such an arrangement is not necessarily required.

In the examples shown in FIGS. 4-6, the contact areas of different rack portions do not overlap, but are continuous to thereby define a total contact area that extends the full length of the range of motion of the rack assembly 110. Thus, only one pinion is in contact with a corresponding rack portion at an given time. However, some alternative embodiments may employ a small overlap region to avoid any slippage as a transition is made from one pinion engaging one contact area to another pinion engaging a different contact area.

By selecting gear ratios to define desirable characteristics (e.g., in terms of either responsiveness or ease of providing steering inputs), a designer may provide an operator with a steering system that requires variable effort to turn the steering wheel 80 based on the position of the steering wheel 80. Thus, for example, the designer may select gear ratios that make steering more responsive near a neutral position, but easier to turn at positions near full deflection (e.g., near max right or max left). Alternatively, the designer may select gear ratios that may steering easier near the neutral position, but more responsive at positions near full deflection. As such, designers may provide operators with a steering system that offers variations in the amount of control, responsiveness, ease of use based on the degree of turn deflection from the neutral position. This may provide operators with an overall improved user experience associated with steering and controlling a riding lawn care vehicle 10.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A riding lawn care vehicle comprising:
a frame to which wheels of the riding lawn care vehicle are attachable; and
a steering assembly comprising a steering apparatus operably coupled to at least one of the wheels of the riding lawn care vehicle to provide steering inputs to the at least one of the wheels based on a position of the steering apparatus,
wherein the steering assembly further comprises:
a steering column extending from the steering apparatus to rotate responsive to movement of the steering apparatus;
a pinion assembly disposed along the steering column and comprising at least two pinions of different sizes; and a rack assembly operably coupled to the frame and the at least one wheel of the riding lawn care vehicle to translate steering inputs from the steering apparatus to the at least one wheel via the pinion assembly, the rack assembly comprising at least two rack portions of different sizes, wherein the pinion assembly comprises:

a first circular pinion having a first diameter and disposed at a first position along the steering column; and a second circular pinion having a second diameter and disposed at a second position along the steering column, wherein the rack assembly comprises:

a first partial rack portion defining a first contact area over which contact with the first pinion is enabled; and a second partial rack portion defining a second contact area over which contact with the second pinion is enabled, wherein the first partial rack portion and the second partial rack portion are separate members of the rack assembly, and wherein the first and second partial rack portions share a common pivot point and have gear teeth at the first and second contact areas, respectively, the first partial rack portion extending from the common pivot point by a third diameter over an entirety of the first contact area and the second partial rack portion extending from the common pivot point by a fourth diameter over an entirety of the second contact area, the first and second partial rack portions each comprising gear teeth disposed at an external periphery thereof to engage gear teeth of the first and second pinions, respectively.

2. The riding lawn care vehicle of claim 1, wherein a difference between the third and fourth diameters is equal to a difference between the first and second diameters.

3. The riding lawn care vehicle of claim 1, wherein only one of the first pinion or the second pinion contacts a corresponding one of the first contact area or the second contact area over an entirety of a range of motion of the steering apparatus.

4. The riding lawn care vehicle of claim 1, wherein the first pinion has a larger diameter than the second pinion and the first pinion is disposed at a distal end of the steering column.

5. The riding lawn care vehicle of claim 1, wherein the first pinion has a smaller diameter than the second pinion and the first pinion is disposed at a distal end of the steering column.

6. The riding lawn care vehicle of claim 1, wherein the first contact area is disposed to correspond to a portion of a range of motion of the steering apparatus proximate to a neutral position of the steering apparatus, and the second contact area is disposed to correspond to portions of the range of motion of the steering apparatus proximate to maximum deflection from the neutral position.

7. The riding lawn care vehicle of claim 1, wherein the second contact area comprises two portions, and wherein respective ones of the two portions extend from opposite ends of the first contact area to define a discontinuous second contact area with the first contact area interposed therebetween.

8. The riding lawn care vehicle of claim 1, wherein the pinion assembly and the rack assembly combine to provide at least two different gear ratios over respective different portions of a full range of motion of the steering apparatus.

9. The riding lawn care vehicle of claim 1, wherein the steering apparatus is a steering wheel or handlebars.

10. A steering assembly for steering control of a riding lawn care vehicle, the steering assembly comprising:

a steering apparatus operably coupled to at least one wheel of the riding lawn care vehicle to provide steering inputs to the at least one wheel based on a position of the steering apparatus;

a steering column extending from the steering apparatus to rotate responsive to movement of the steering apparatus;

a pinion assembly disposed along the steering column and comprising at least two pinions of different sizes; and a rack assembly operably coupled to a frame to which wheels of the riding lawn care vehicle are attachable, the rack assembly being further operably coupled to the at least one wheel of the riding lawn care vehicle to translate steering inputs from the steering apparatus to the at least one wheel via the pinion assembly, the rack assembly comprising at least two rack portions of different sizes, wherein the pinion assembly comprises:

a first circular pinion having a first diameter and disposed at a first position along the steering column; and a second circular pinion having a second diameter and disposed at a second position along the steering column, wherein the rack assembly comprises:

a first partial rack portion defining a first contact area over which contact with the first pinion is enabled; and a second partial rack portion defining a second contact area over which contact with the second pinion is enabled, wherein the first partial rack portion and the second partial rack portion are separate members of the rack assembly, and wherein the first and second partial rack portions share a common pivot point and have gear teeth at the first and second contact areas, respectively, the first partial rack portion extending from the common pivot point by a third diameter over an entirety of the first contact area and the second partial rack portion extending from the common pivot point by a fourth diameter over an entirety of the second contact area, the first and second partial rack portions each comprising gear teeth disposed at an external periphery thereof to engage gear teeth of the first and second pinions, respectively.

11. The steering assembly of claim 10, wherein a difference between the third and fourth diameters is equal to a difference between the first and second diameters.

12. The steering assembly of claim 10, wherein only one of the first pinion or the second pinion contacts a corresponding one of the first contact area or the second contact area over an entirety of a range of motion of the steering apparatus.

13. The steering assembly of claim 10, wherein the first pinion has a larger diameter than the second pinion and the first pinion is disposed proximate a distal end of the steering column.

14. The steering assembly of claim 10, wherein the first pinion has a smaller diameter than the second pinion and the first pinion is disposed at a distal end of the steering column.

15. The steering assembly of claim 10, wherein the first contact area is disposed to correspond to a portion of a range of motion of the steering apparatus proximate to a neutral position of the steering apparatus, and the second contact area is disposed to correspond to portions of the range of motion of the steering apparatus proximate to maximum deflection from the neutral position.

16. The steering assembly of claim 10, wherein the second contact area comprises two portions, and wherein respective ones of the two portions extend from opposite ends of the first contact area to define a discontinuous second contact area with the first contact area interposed therebetween.

17. The steering assembly of claim 10, wherein the pinion assembly and the rack assembly combine to provide at least two different gear ratios over respective different portions of a full range of motion of the steering apparatus.

18. The steering assembly of claim 10, wherein the first partial rack portion comprises a first partial disc shaped member, the second partial rack portion comprises a second partial disc shaped member, and the first partial disc shaped member and the second partial disc shaped member are separate members.

19. A riding lawn care vehicle comprising:
a frame to which wheels of the riding lawn care vehicle are attachable; and
a steering assembly comprising a steering apparatus operably coupled to at least one of the wheels of the riding lawn care vehicle to provide steering inputs to the at least one of the wheels based on a position of the steering apparatus,
wherein the steering assembly further comprises:
a steering column extending from the steering apparatus to rotate responsive to movement of the steering apparatus;
a pinion assembly disposed along the steering column and comprising at least two pinions of different sizes; and
a rack assembly operably coupled to the frame and the at least one wheel of the riding lawn care vehicle to translate steering inputs from the steering apparatus to the at least one wheel via the pinion assembly, the rack assembly comprising at least two rack portions of different sizes,
wherein the pinion assembly comprises:
a first circular pinion having a first diameter and disposed at a first position along the steering column; and
a second circular pinion having a second diameter and disposed at a second position along the steering column,
wherein the rack assembly comprises:
a first partial rack portion defining a first contact area over which contact with the first pinion is enabled; and
a second partial rack portion defining a second contact area over which contact with the second pinion is enabled,
wherein the first partial rack portion and the second partial rack portion are separate members of the rack assembly, and
wherein the first partial rack portion comprises a first partial disc shaped member, the second partial rack portion comprises a second partial disc shaped member, and the first partial disc shaped member and the second partial disc shaped member are separate members.

20. The riding lawn care vehicle of claim 19, wherein the first and second partial rack portions share a common pivot point and have gear teeth at the first and second contact areas, respectively, the first partial rack portion extending from the common pivot point by a third diameter over an entirety of the first contact area and the second partial rack portion extending from the common pivot point by a fourth diameter over an entirety of the second contact area, the first and second partial rack portions each comprising gear teeth disposed at an external periphery thereof to engage gear teeth of the first and second pinions, respectively, and
wherein a difference between the third and fourth diameters is equal to a difference between the first and second diameters.

21. The riding lawn care vehicle of claim 19, wherein only one of the first pinion or the second pinion contacts a corresponding one of the first contact area or the second contact area over an entirety of a range of motion of the steering apparatus.

22. The riding lawn care vehicle of claim 19, wherein the first pinion has a larger diameter than the second pinion and the first pinion is disposed at a distal end of the steering column.

23. The riding lawn care vehicle of claim 19, wherein the first pinion has a smaller diameter than the second pinion and the first pinion is disposed at a distal end of the steering column.

24. The riding lawn care vehicle of claim 19, wherein the first contact area is disposed to correspond to a portion of a range of motion of the steering apparatus proximate to a neutral position of the steering apparatus, and the second contact area is disposed to correspond to portions of the range of motion of the steering apparatus proximate to maximum deflection from the neutral position.

25. The riding lawn care vehicle of claim 19, wherein the second contact area comprises two portions, and wherein respective ones of the two portions extend from opposite ends of the first contact area to define a discontinuous second contact area with the first contact area interposed therebetween.

26. The riding lawn care vehicle of claim 19, wherein the pinion assembly and the rack assembly combine to provide at least two different gear ratios over respective different portions of a full range of motion of the steering apparatus.

* * * * *